US012764461B2

(12) United States Patent
Zou

(10) Patent No.: US 12,764,461 B2
(45) Date of Patent: Oct. 13, 2026

(54) AUDIO PROCESSING METHOD AND APPARATUS AND ELECTRONIC DEVICE

(71) Applicant: VIVO MOBILE COMMUNICATION CO., LTD., Guangdong (CN)

(72) Inventor: Yuzhong Zou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 176 days.

(21) Appl. No.: 18/800,298

(22) Filed: Aug. 12, 2024

(65) Prior Publication Data

US 2024/0406620 A1 Dec. 5, 2024

Related U.S. Application Data

(63) Continuation of application No. PCT/CN2023/075127, filed on Feb. 9, 2023.

(30) Foreign Application Priority Data

Feb. 11, 2022 (CN) ........................ 202210127948.8

(51) Int. Cl.

*H04R 1/42* (2006.01)
*A45C 13/00* (2006.01)

(Continued)

(52) U.S. Cl.

CPC ............. *H04R 1/42* (2013.01); *A45C 13/001* (2013.01); *F16M 11/2028* (2013.01);

(Continued)

(58) Field of Classification Search

CPC ... H04R 1/28; H04R 1/30; H04R 1/42; H04R 3/00; H04R 1/02; H04R 1/10; H04R 1/40; G10K 11/16; H05K 5/00; F16M 11/2028

See application file for complete search history.

(56) References Cited

U.S. PATENT DOCUMENTS 6,292,573 B1 9/2001 Zurek et al.
7,350,618 B2 * 4/2008 Goh .................... H04R 1/2842 181/197

(Continued)

FOREIGN PATENT DOCUMENTS

CN 101895802 A 11/2010
CN 103179487 A 6/2013

(Continued)

*Primary Examiner* — Rasha S Al Aubaidi
(74) *Attorney, Agent, or Firm* — Price Heneveld LLP

(57) ABSTRACT

This application discloses an audio processing method and apparatus and an electronic device. The electronic device includes a device body and a decorative ring assembly. The device body is provided with a first opening, and the decorative ring assembly is assembled onto the device body. The decorative ring assembly includes a cover plate and an expandable connection component. The cover plate corresponds to a sound module of the device body, the expandable connection component has a cavity, a first end of the expandable connection component is connected to the cover plate, a second end of the expandable connection component is connected to the sound module, and the cavity communicates with an acoustic chamber of the sound module. The cover plate is able to rotate relative to the device body, and a volume of the cavity corresponds to a rotation angle of the cover plate.

19 Claims, 6 Drawing Sheets

(51) Int. Cl.
*F16M 11/20* (2006.01)
*H04R 3/00* (2006.01)

(52) U.S. Cl.
CPC ............ *H04R 3/00* (2013.01); *A45C 2200/15* (2013.01); *H04R 2430/01* (2013.01)

(56) References Cited

U.S. PATENT DOCUMENTS

| | | | | |
|---|---|---|---|---|
| 2005/0253957 | A1 | 11/2005 | Gustavsson et al. | |
| 2008/0062258 | A1* | 3/2008 | Bentkovski ........ | H04N 21/2187 348/E7.086 |
| 2020/0322714 | A1* | 10/2020 | Alva .................... | H04R 29/001 |
| 2023/0262156 | A1 | 8/2023 | Guo | |
| 2025/0267386 | A1* | 8/2025 | Chen ...................... | H04N 23/51 |

FOREIGN PATENT DOCUMENTS

| | | | |
|---|---|---|---|
| CN | 205581714 | U | 9/2016 |
| CN | 113286025 | A | 8/2021 |
| CN | 113315859 | A | 8/2021 |
| CN | 114501227 | A | 5/2022 |
| JP | 2001169376 | A | 6/2001 |
| JP | 2003323230 | A | 11/2003 |

* cited by examiner

AUDIO PROCESSING METHOD AND APPARATUS AND ELECTRONIC DEVICE

CROSS-REFERENCE TO RELATED APPLICATIONS

This application is a Bypass continuation application of PCT International Application No. PCT/CN2023/075127 filed on Feb. 9, 2023, which claims priority to Chinese Patent Application No. 202210127948.8, filed in China on Feb. 11, 2022, which are incorporated herein by reference in their entireties.

TECHNICAL FIELD

This application pertains to the field of electronic product technologies, and specifically relates to an audio processing method and apparatus and an electronic device.

BACKGROUND

Currently, to highlight the appearance effect of electronic devices such as mobile phones, it is common to increase the coverage area of the decorative ring around the rear camera. However, the increase in coverage area of the decorative ring around the rear camera occupies more space of the device, making it difficult for the electronic device to balance the overall appearance effect and the overall space utilization.

It can be seen that the electronic devices in the related art have the difficulty in balancing the overall appearance effect and the overall space utilization.

SUMMARY

This application is intended to provide an audio processing method and apparatus and an electronic device.

According to a first aspect, an embodiment of this application provides an electronic device including a device body and a decorative ring assembly, where the device body is provided with a first opening, and the decorative ring assembly is assembled onto the device body through the first opening; and the decorative ring assembly includes a cover plate and an expandable connection component, where the cover plate corresponds to a sound module of the device body, the expandable connection component has a cavity, a first end of the expandable connection component is connected to the cover plate, a second end of the expandable connection component is connected to the sound module, and the cavity communicates with an acoustic chamber of the sound module; where the cover plate is able to rotate relative to the device body, and a volume of the cavity corresponds to a rotation angle of the cover plate.

According to a second aspect, an embodiment of this application provides an audio processing method, applied to the electronic device according to the first aspect, where the electronic device includes a device body, a cover plate, and a sound module, and the method includes:

obtaining position information of the cover plate relative to the device body; and adjusting an audio parameter of the sound module in a case that the position information indicates that the cover plate is in an open state.

According to a third aspect, an embodiment of this application provides an audio processing apparatus, applied to the electronic device according to the first aspect, where the electronic device includes a device body, a cover plate, and a sound module, and the apparatus includes:

an obtaining module configured to obtain position information of the cover plate relative to the device body; and an adjusting module configured to adjust an audio parameter of the sound module in a case that the position information indicates that the cover plate is in an open state.

According to a fourth aspect, an embodiment of this application provides an electronic device. The electronic device includes a processor and a memory, where the memory stores a program or instructions capable of running on the processor, and when the program or instructions are executed by the processor, the steps of the method according to the second aspect are implemented.

According to a fifth aspect, an embodiment of this application provides a readable storage medium, where the readable storage medium stores a program or instructions, and when the program or instructions are executed by a processor, the steps of the method according to the second aspect are implemented.

According to a sixth aspect, an embodiment of this application provides a chip, where the chip includes a processor and a communication interface, the communication interface is coupled to the processor, and the processor is configured to run a program or instructions to implement the method according to the second aspect.

According to a seventh aspect, an embodiment of this application provides a computer program product, where the program product is stored in a storage medium, and the program product is executed by at least one processor to implement the method according to the second aspect.

BRIEF DESCRIPTION OF DRAWINGS

The above and/or additional aspects and advantages of this application will become obvious and easy to understand from the description of the embodiments with reference to the following drawings.

DESCRIPTION OF EMBODIMENTS

Figure 1:
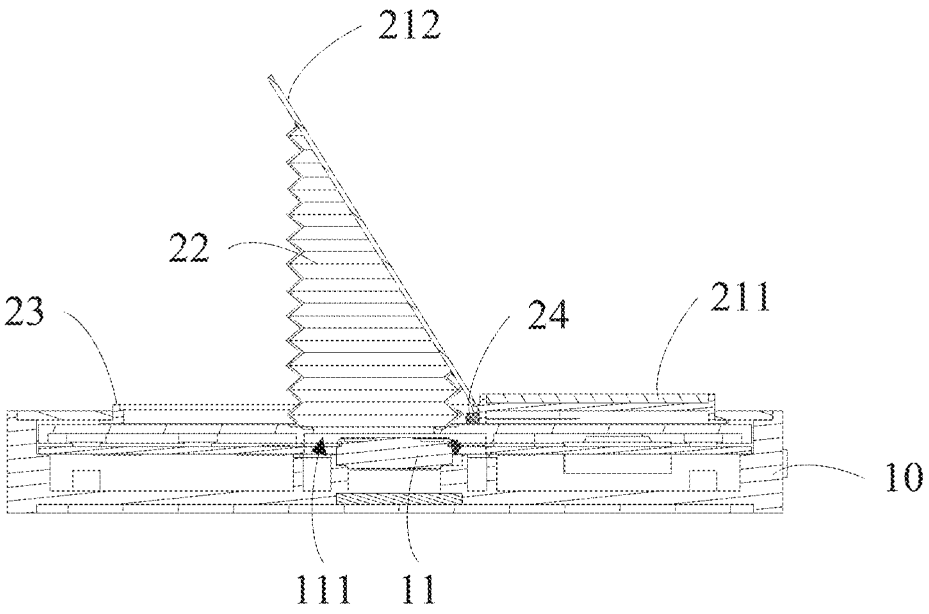
FIG. 1 is a first schematic structural diagram of an electronic device according to an embodiment of this application.
Figure 2:
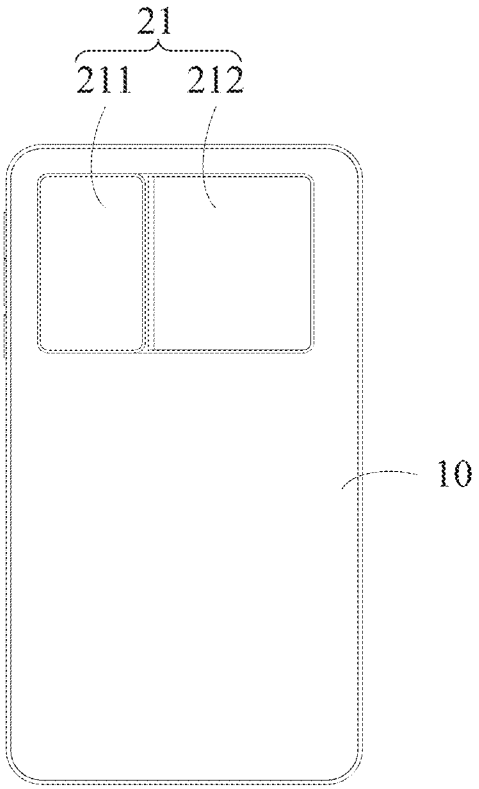
FIG. 2 is a second schematic structural diagram of an electronic device according to an embodiment of this application.
Figure 3:
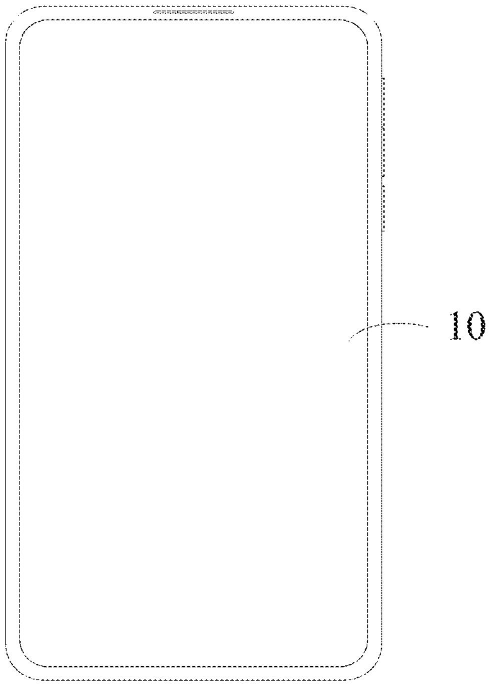
FIG. 3 is a third schematic structural diagram of an electronic device according to an embodiment of this application.
Figure 4:
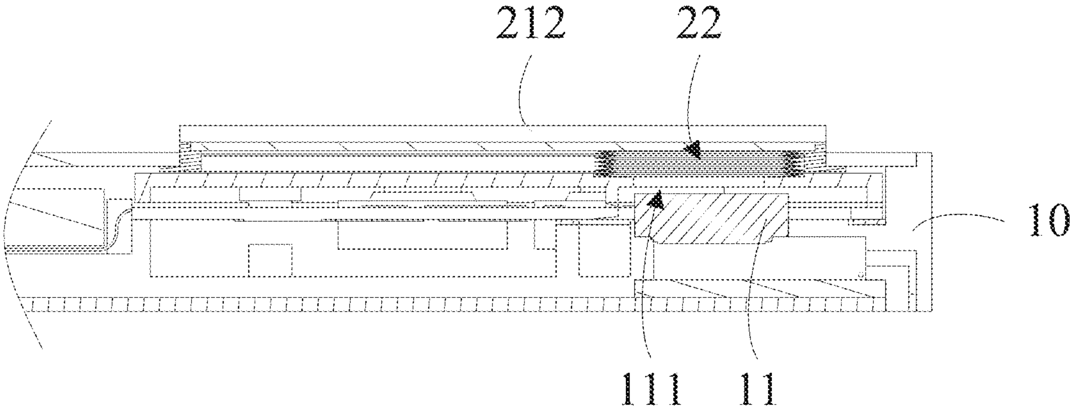
FIG. 4 is a fourth schematic structural diagram of an electronic device according to an embodiment of this application.
Figure 5:
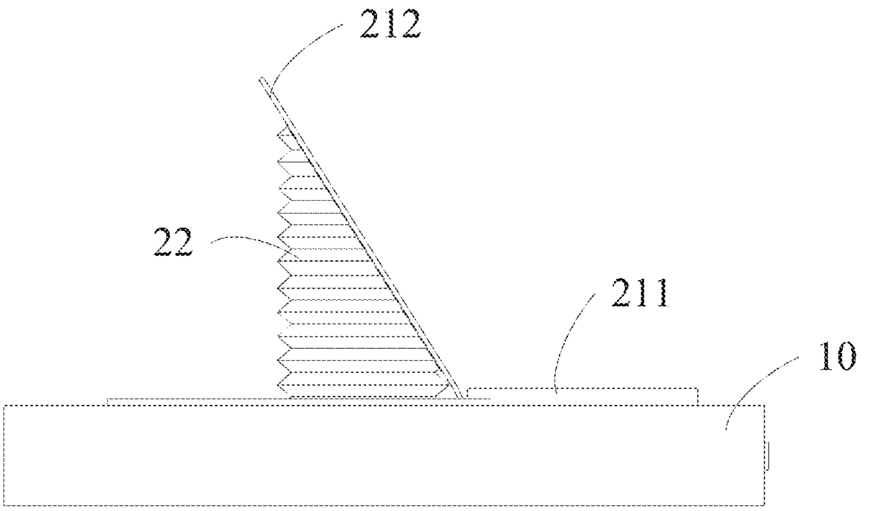
FIG. 5 is a fifth schematic structural diagram of an electronic device according to an embodiment of this application.

The embodiments of this application are described in detail below. Examples of the embodiments are shown in the accompanying drawings, and reference signs that are the same or similar always indicate the same or similar elements or elements with the same or similar functions. The embodiments described below with reference to the accompanying drawings are illustrative and merely for explaining this application, and cannot be construed as any limitations on this application. All other embodiments obtained by persons of ordinary skill in the art based on the embodiments of this application without creative efforts shall fall within the protection scope of this application.

A feature modified by the term "first" or "second" in the specification and claims of this application can explicitly or implicitly include one or more such features. In the description of this application, unless otherwise stated, "a plurality of" means two or more. In addition, in the specification and claims, "and/or" indicates at least one of the connected objects, and the character "/" generally indicates an "or" relationship between the contextually associated objects.

In the description of this application, it should be noted that unless otherwise specified and defined explicitly, the terms "mounting", "connection", and "joining" should be understood in their general senses. For example, they may refer to a fixed connection, a detachable connection, or an integral connection; may refer to a mechanical connection or an electrical connection; and may refer to a direct connection, an indirect connection via an intermediate medium, or an internal communication between two elements. Persons of ordinary skill in the art can understand specific meanings of these terms in this application as appropriate to specific situations.

As shown in FIG. 1 to FIG. 6, embodiments of this application provide an electronic device. The electronic device includes a device body 10 and a decorative ring assembly, where the device body 10 is provided with a first opening, and the decorative ring assembly is assembled onto the device body 10 through the first opening; and

- the decorative ring assembly includes a cover plate 21 and an expandable connection component 22, where the cover plate 21 corresponds to a sound module 11 of the device body 10, the expandable connection component 22 has a cavity, a first end of the expandable connection component 22 is connected to the cover plate 21, a second end of the expandable connection component 22 is connected to the sound module 11, and the cavity communicates with an acoustic chamber 111 of the sound module 11; where
- the cover plate 21 is able to rotate relative to the device body 10, and a volume of the cavity corresponds to a rotation angle of the cover plate 21.

In these embodiments, because the cavity of the expandable connection component 22 communicates with the acoustic chamber 111 of the sound module 11, a volume of the acoustic chamber 111 of the sound module 11 changes with the volume of the cavity of the expandable connection component 22. In addition, the volume of the cavity of the expandable connection component 22 can change corresponding to the rotation angle of the cover plate 21, which means that the volume of the cavity of the expandable connection component 22 changes with the rotation angle of the cover plate 21, so the volume of the acoustic chamber 111 of the sound module 11 can be adjusted by adjusting the rotation angle of the cover plate 21, thereby achieving the purpose of enriching the decorative ring assembly.

Moreover, the cavity of the expandable connection component 22 communicates with the acoustic chamber 111 of the sound module 11, which is equivalent that the size of the acoustic chamber 111 of the sound module 11 is extended, so the space of the electronic device occupied by the acoustic chamber 111 of the sound module 11 can be reduced. Therefore, the arrangement of the decorative ring assembly not only improves overall appearance effect of the electronic device, but also allows for expansion of the volume of the acoustic chamber of the sound module 11 and improves space utilization of the electronic device, thereby achieving the purpose of balancing the overall appearance effect and overall space utilization of the electronic device.

In addition, expanding the volume of the acoustic chamber 111 of the sound module 11 can also improve the sound effect of the sound module 11.

In some embodiments, the cavity of the expandable connection component 22 may communicate with a rear acoustic chamber of the sound module 11, which means that the cavity of the expandable connection component 22 can be configured to expand a volume of the rear acoustic chamber of the sound module 11. For example, when the cover plate 21 is in an open state, the volume of the cavity of the expandable connection component 22 is larger than the volume of the cavity of the expandable connection component 22 when the cover plate 21 is in a closed state, thereby increasing the rear acoustic chamber of the sound module 11. In this way, with the same stereo playback effect ensured, an audio parameter of the sound module 11 can be adjusted to reduce power consumption of the sound module 11, thereby improving endurance of the electronic device. In addition, expanding the volume of the rear acoustic chamber of the sound module 11 can also improve the low-frequency effect of the sound module 11 and enhance the stereo effect, thereby providing users with better audiovisual experience.

The expandable connection component 22 has a compressed state and an expanded state, and the compressed state and expanded state of the expandable connection component 22 are associated with the rotation angle of the cover plate 21. For example, when the rotation angle of the cover plate 21 relative to the device body 10 changes from small to large, the cover plate 21 can drive the expandable connection component 22 to change from the compressed state to the expanded state. Accordingly, when the rotation angle of the cover plate 21 relative to the device body 10 changes from large to small, the cover plate 21 can drive the expandable connection component 22 to change from the expanded state to the compressed state.

It can be understood that the volume of the cavity of the expandable connection component 22 in the compressed state is smaller than the volume of the cavity of the expandable connection component 22 in the expanded state.

The expandable connection component 22 may be an expandable tube structure, and the cavity hermetically communicates with the acoustic chamber 111 of the sound module 11, so that the cavity functions as an extended acoustic chamber of the sound module 11.

Optionally, the device body 10 further includes a main board bracket and a circuit board, where the main board bracket is provided with a through hole, allowing the cavity of the expandable connection component 22 to communicate with the acoustic chamber 111 of the sound module 11.

The sound module 11 further includes a circuit board and sealing foam. The circuit board can be electrically connected to a main board of the electronic device to implement audio output of the sound module 11. The sealing foam is configured to fill a gap between the circuit board and the main board bracket to improve the sealing effect of the acoustic chamber 111 of the sound module 11.

Optionally, the cover plate 21 includes a first cover plate 211 and a second cover plate 212, the first cover plate 211 corresponds to a rear camera (not shown in the figure) of the device body 10, and the second cover plate 212 corresponds to the sound module 11; and the first end of the expandable connection component 22 is connected to the second cover plate 212; where the second cover plate 212 is able to rotate relative to the device body 10, and the volume of the cavity corresponds to a rotation angle of the second cover plate 212.

In these embodiments, controlling only rotation of the second cover plate 212 corresponding to the sound module 11 can reduce a driving force for driving rotation of the second cover plate 212, and allow the first cover plate 211 to provide continuous and stable protection for the rear camera.

In some embodiments, the second cover plate 212 can be driven to rotate so as to drive the expandable connection component 22 to switch between the compressed state and the expanded state, thereby adjusting the volume of the acoustic chamber of the sound module 11 and achieving the purpose of improving the low-frequency effect of the sound module 11.

Optionally, during rotation of the second cover plate 212, the second cover plate 212 is able to switch between a closed state and an open state; and a volume of the cavity in the closed state is smaller than a volume of the cavity in the open state.

It can be understood that the compressed state of the expandable connection component 22 corresponds to the closed state of the second cover plate 212, and the expanded state of the expandable connection component 22 corresponds to the open state of the second cover plate 212.

Further optionally, when the second cover plate 212 is in the open state, the second cover plate 212 is configured to support the device body 10.

In these embodiments, the second cover plate 212 in the open state can serve as a support foot for the device body 10, which avoids the need to arrange a separate support structure for the electronic device, allows users to view the displayed content of the electronic device in landscape mode, and effectively enriches functions of the decorative ring assembly.

Optionally, the expandable connection component 22 includes a first connecting end face connected to the second cover plate 212 and a second connecting end face connected to the sound module 11; where a cross-sectional area of the first connecting end face is larger than a cross-sectional area of the second connecting end face.

In these embodiments, the cross-sectional area of the first connecting end face being larger than the cross-sectional area of the second connecting end face can increase a volume increment of the expandable connection component 22 in the expanded state, thereby achieving the purpose of further increasing the volume of the acoustic chamber of the sound module 11.

In some embodiments, an expandable body of the expandable connection component 22 may be arranged in a tubular shape, and the first connecting end face may be hermetically connected to the second cover plate 212 by a sealant, so as to improve the sealing effect of the acoustic chamber of the sound module 11.

Optionally, as shown in FIG. 1, the decorative ring assembly further includes a decorative ring bracket 23, the decorative ring bracket 23 is assembled onto the device body 10 through the first opening, and the first cover plate 211 is fixedly connected to the decorative ring bracket 23 and the second cover plate 212 is rotatably connected to the decorative ring bracket 23.

The decorative ring bracket 23 is provided with a mounting groove, and the second cover plate 212 can be assembled in the mounting groove and can rotate relative to the decorative ring bracket 23 in the mounting groove. In addition, the decorative ring assembly further includes a fastener 24, where the fastener 24 is configured to fasten the second cover plate 212 onto the decorative ring bracket 23, so as to prevent loosening of the second cover plate 212 during flipping from affecting performance of the electronic device.

During assembling of the decorative ring assembly, the second cover plate 212 can be inserted from the bottom of the decorative ring bracket 23 and move upward until mounting portions on two sides of the second cover plate 212 are completely embedded into the mounting groove of the decorative ring bracket 23, and then assembled onto the decorative ring bracket 23 through the fastener 24, so as to prevent the second cover plate 212 from loosening during flipping.

Figure 6:
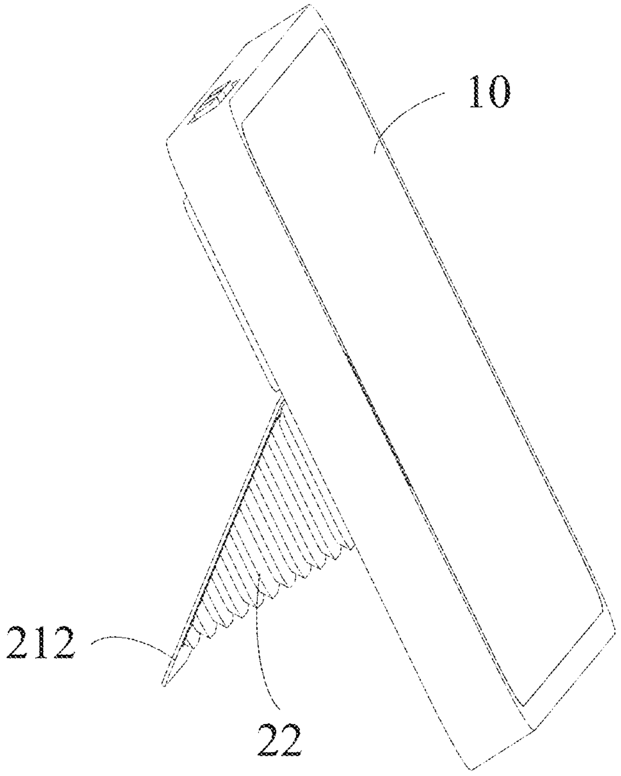
FIG. 6 is a sixth schematic structural diagram of an electronic device according to an embodiment of this application.

As shown in FIG. 6, when opened, the second cover plate 212 can form a bracket of the electronic device, so that the electronic device can be placed horizontally on a desktop, allowing users to watch videos in landscape mode or perform landscape-oriented operations.

Figure 7:
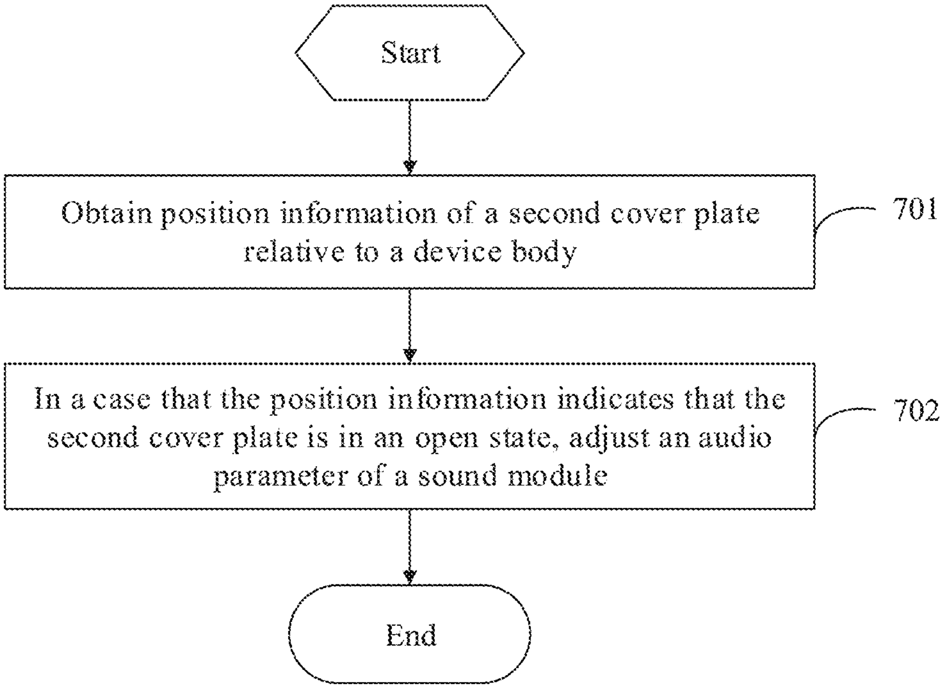
FIG. 7 is a flowchart of an audio processing method according to an embodiment of this application.

As shown in FIG. 7, an embodiment of this application further provides an audio processing method. The audio processing method can be applied to the electronic device in the foregoing embodiments, and the audio processing method includes the following steps.

Step 701: Obtain position information of the cover plate relative to the device body.

In this step, the position information of the cover plate relative to the device body can be obtained by a detection module such as a position sensor disposed in the electronic device, so as to determine whether the cover plate is in an open state.

In some embodiments, the position information of the cover plate relative to the device body can be detected by a position sensor disposed on the cover plate.

Specifically, the position sensor may be a distance sensor, a Hall sensor, or the like.

In some other embodiments, the rotation angle of the cover plate can be detected by an angle sensor disposed on the cover plate, so as to determine the position information of the cover plate relative to the device body.

Step 702: Adjust an audio parameter of the sound module in a case that the position information indicates that the cover plate is in an open state.

In this step, in a case that the detected position information indicates that the cover plate is in the open state, that is, in a case that the volume of the acoustic chamber of the sound module is effectively extended, the audio parameter of the sound module can be adjusted to improve the audio output effect of the sound module.

For example, in a case that the detected position information indicates that the cover plate is in the open state, with the same stereo playback effect ensured, the audio parameter of the sound module can be adjusted (for example, reducing audio output power of the sound module) to reduce the power consumption of the sound module, thereby improving the endurance of the electronic device. In addition, expanding the volume of the rear acoustic chamber of the sound module can also improve the low-frequency effect of the sound module and enhance the stereo effect, thereby providing users with better audiovisual experience.

In some embodiments, a control instruction can be output by a processor of the electronic device to reduce the audio output power of the sound module, thereby achieving the purpose of reducing the power consumption of the sound module.

It should be noted that the implementations of the electronic device are also applicable to the embodiment of the audio processing method, with the same technical effects achieved. Details are not described herein again.

According to the audio processing method provided in this embodiment of this application, the position information of the cover plate relative to the device body is obtained; and the audio parameter of the sound module is adjusted in a case that the position information indicates that the cover plate is in the open state. This can improve the audio output effect of the sound module.

The audio processing method provided in this embodiment of this application can be performed by an audio processing apparatus. In the embodiments of this application, the audio processing apparatus performing the audio processing method is used as an example to describe the audio processing apparatus provided in the embodiments of this application.

Figure 8:
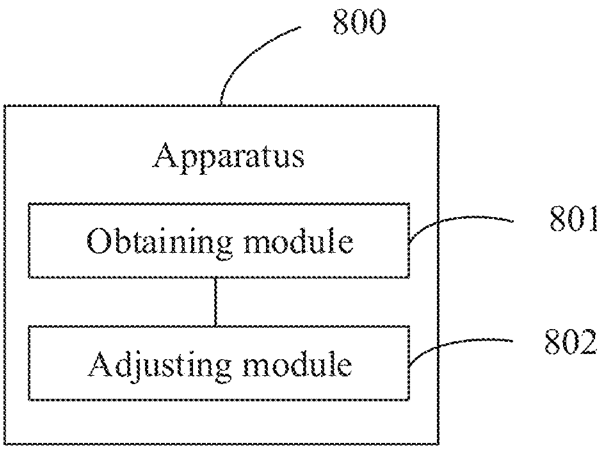
FIG. 8 is a structural diagram of an audio processing apparatus according to an embodiment of this application.

As shown in FIG. 8, an embodiment of this application further provides an audio processing apparatus. The apparatus 800 includes:

- an obtaining module 801 configured to obtain position information of the cover plate relative to the device body; and
- an adjusting module 802 configured to adjust an audio parameter of the sound module in a case that the position information indicates that the cover plate is in an open state.

Optionally, the adjusting module 802 is specifically configured to reduce audio output power of the sound module.

The audio processing apparatus in this embodiment of this application may be an electronic device or a component in an electronic device such as an integrated circuit or chip. The electronic device may be a terminal or other devices than terminals. For example, the electronic device may be a mobile phone, a tablet computer, a notebook computer, a palmtop computer, an in-vehicle electronic device, a mobile internet device (MID), an augmented reality (AR) or virtual reality (VR) device, a robot, a wearable device, an ultra-mobile personal computer (UMPC), a netbook, a personal digital assistant (PDA), or the like, or may be a network attached storage (NAS), a personal computer (PC), a television (TV), a teller machine, a self-service machine, or the like. This is not specifically limited in the embodiments of this application.

The audio processing apparatus in this embodiment of this application may be an apparatus having an operating system. The operating system may be an Android operating system, an iOS operating system, or another possible operating system. This is not specifically limited in the embodiments of this application.

The audio processing apparatus provided in this embodiment of this application can implement the processes implemented in the method embodiment in FIG. 7. To avoid repetition, details are not described herein again.

Figure 9:
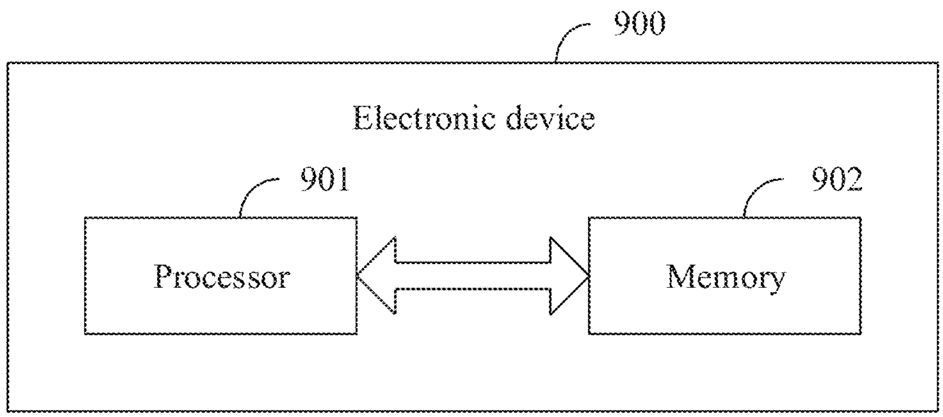
FIG. 9 is a structural diagram of an electronic device according to an embodiment of this application.

Optionally, as shown in FIG. 9, an embodiment of this application further provides an electronic device 900 including a processor 901 and a memory 902. The memory 902 stores a program or instructions capable of running on the processor 901. When the program or instructions are executed by the processor 901, the steps of the foregoing audio processing method embodiment are implemented, with the same technical effects achieved. To avoid repetition, details are not described herein again.

It should be noted that the electronic device in this embodiment of this application includes the foregoing mobile electronic devices and non-mobile electronic devices.

Figure 10:
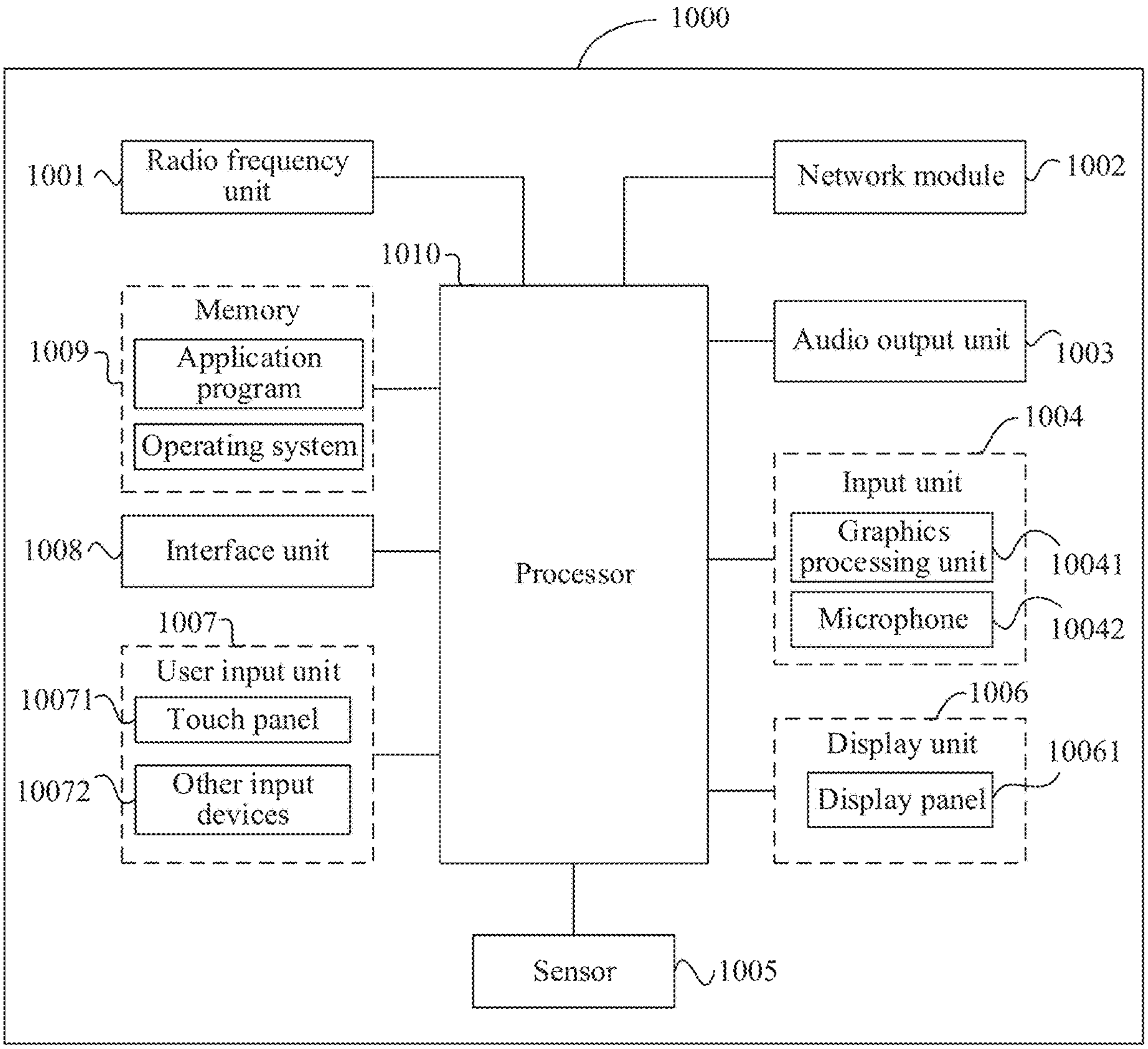
FIG. 10 is a structural diagram of an electronic device according to another embodiment of this application.

FIG. 10 is a structural diagram of an electronic device for implementing the embodiments of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Persons skilled in the art can understand that the electronic device 1000 may further include a power supply (for example, a battery) for supplying power to the components. The power supply may be logically connected to the processor 1010 via a power management system, so that functions such as charge management, discharge management, and power consumption management are implemented via the power management system. The structure of the electronic device shown in FIG. 10 does not constitute any limitation on the electronic device. The electronic device may include more or fewer components than shown in the figure, or combine some of the components, or arrange the components differently. Details are not described herein.

The processor 1010 is configured to: obtain position information of the cover plate relative to the device body; and adjust an audio parameter of the sound module in a case that the position information indicates that the cover plate is in an open state.

Optionally, the processor 1010 is configured to reduce audio output power of the sound module.

It should be understood that in the embodiments of this application, the input unit 1004 may include a graphics processing unit (GPU) 10041 and a microphone 10042. The graphics processing unit 10041 processes image data of a static picture or a video that is obtained by an image capture apparatus (for example, a camera) in an image capture mode or a video capture mode. The display unit 1006 may include a display panel 10061. The display panel 10061 may be configured in a form of a liquid crystal display, an organic light-emitting diode display, or the like. The user input unit 1007 includes at least one of a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function button (for example, a volume control button or an on/off button), a trackball, a mouse, and a joystick. Details are not described herein.

The memory 1009 may be configured to store software programs and various data. The memory 1009 may mainly include a first storage area for storing programs or instructions and a second storage area for storing data. The first storage area may store an operating system, an application program or instructions required by at least one function (for example, a sound play function or an image play function), and the like. Additionally, the memory 1009 may be a volatile memory or a non-volatile memory, or the memory 1009 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1009 in the embodiments of this application includes but is not be limited to these and any other applicable types of memories.

The processor 1010 may include one or more processing units. Optionally, the processor 1010 may integrate an application processor and a modem processor. The application processor primarily processes operations involving an operating system, user interface, application program, or the like. The modem processor primarily processes radio communication signals, for example, being a baseband processor. It can be understood that the modem processor may alternatively be not integrated in the processor 1010.

An embodiment of this application further provides a readable storage medium. The readable storage medium stores a program or instructions, and when the program or instructions are executed by a processor, the processes of the foregoing audio processing method embodiment are implemented, with the same technical effects achieved. To avoid repetition, details are not described herein again.

The processor is a processor in the electronic device in the foregoing embodiments. The readable storage medium includes a computer-readable storage medium such as a computer read-only memory ROM, a random access memory RAM, a magnetic disk, or an optical disc.

An embodiment of this application further provides a chip. The chip includes a processor and a communication interface, where the communication interface is coupled to the processor, and the processor is configured to run a program or instructions to implement the processes of the foregoing audio processing method embodiment, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application provides a computer program product, where the program product is stored in a storage medium. When the program product is executed by at least one processor, the processes of the foregoing audio processing method embodiment are implemented, with the same technical effects achieved. To avoid repetition, details are not described herein again.

It should be noted that in this specification, the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the embodiments of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

Based on the foregoing description of the embodiments, persons skilled in the art can clearly understand that the method in the foregoing embodiments can be implemented through software on a necessary general hardware platform or certainly through hardware only, but in many cases, the former is the more preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An electronic device, comprising a device body and a decorative ring assembly, wherein the device body is provided with a first opening, and the decorative ring assembly is assembled onto the device body through the first opening; and the decorative ring assembly comprises a cover plate and an expandable connection component, wherein the cover plate corresponds to a sound module of the device body, the expandable connection component has a cavity, a first end of the expandable connection component is connected to the cover plate, a second end of the expandable connection component is connected to the sound module, and the cavity communicates with an acoustic chamber of the sound module; wherein the cover plate is able to rotate relative to the device body, and a volume of the cavity corresponds to a rotation angle of the cover plate;

wherein the cover plate comprises a first cover plate and a second cover plate, the first cover plate corresponds to a rear camera of the device body, and the second cover plate corresponds to the sound module; and the first end of the expandable connection component is connected to the second cover plate; wherein the second cover plate is able to rotate relative to the device body, and the volume of the cavity corresponds to a rotation angle of the second cover plate.

2. The electronic device according to claim 1, wherein during rotation of the second cover plate, the second cover plate is able to switch between a closed state and an open state; and a volume of the cavity in the closed state is smaller than a volume of the cavity in the open state.

3. The electronic device according to claim 2, wherein the expandable connection component comprises a first connecting end face connected to the second cover plate and a second connecting end face connected to the sound module; wherein a cross-sectional area of the first connecting end face is larger than a cross-sectional area of the second connecting end face.

4. The electronic device according to claim 3, wherein an expandable body of the expandable connection component is arranged in a tubular shape, and the first connecting end face is hermetically connected to the second cover plate by a sealant.

5. The electronic device according to claim 1, wherein the decorative ring assembly further comprises a decorative ring bracket, the decorative ring bracket is assembled onto the device body through the first opening, and the first cover plate is fixedly connected to the decorative ring bracket and the second cover plate is rotatably connected to the decorative ring bracket.

6. An audio processing method, applied to an electronic device, wherein the electronic device comprises a device body and a decorative ring assembly, wherein the device body is provided with a first opening, and the decorative ring assembly is assembled onto the device body through the first opening; and the decorative ring assembly comprises a cover plate and an expandable connection component, wherein the cover plate corresponds to a sound module of the device body, the expandable connection component has a cavity, a first end of the expandable connection component is connected to the cover plate, a second end of the expandable connection component is connected to the sound module, and the cavity communicates with an acoustic chamber of the sound module; wherein the cover plate is able to rotate relative to the device body, and a volume of the cavity corresponds to a rotation angle of the cover plate; wherein the cover plate comprises a first cover plate and a second cover plate, the first cover plate corresponds to a rear camera of the device body, and the second cover plate corresponds to the sound module; and the first end of the expandable connection component is connected to the second cover plate; wherein the second cover plate is able to rotate relative to the device body, and the volume of the cavity corresponds to a rotation angle of the second cover plate, wherein, and the method comprises:

obtaining position information of the cover plate relative to the device body; and adjusting an audio parameter of the sound module in a case that the position information indicates that the cover plate is in an open state.

7. The method according to claim 6, wherein the audio parameter is audio output power, and the adjusting an audio parameter of the sound module comprises:

reducing the audio output power of the sound module.

8. The method according to claim 6, wherein during rotation of the second cover plate, the second cover plate is able to switch between a closed state and an open state; and a volume of the cavity in the closed state is smaller than a volume of the cavity in the open state.

9. The method according to claim 8, wherein the expandable connection component comprises a first connecting end face connected to the second cover plate and a second connecting end face connected to the sound module; wherein a cross-sectional area of the first connecting end face is larger than a cross-sectional area of the second connecting end face.

10. The method according to claim 9, wherein an expandable body of the expandable connection component is arranged in a tubular shape, and the first connecting end face is hermetically connected to the second cover plate by a sealant.

11. The method according to claim 6, wherein the decorative ring assembly further comprises a decorative ring bracket, the decorative ring bracket is assembled onto the device body through the first opening, and the first cover plate is fixedly connected to the decorative ring bracket and the second cover plate is rotatably connected to the decorative ring bracket.

12. An electronic device, comprising a processor and a memory, wherein the memory stores a program or instructions capable of running on the processor, wherein the program or instructions, when executed by the processor, cause the electronic device to perform the steps of the audio processing method according to claim 7.

13. The electronic device according to claim 12, wherein the audio parameter is audio output power, and when adjusting an audio parameter of the sound module, the program or instructions, when executed by the processor, cause the electronic device to perform:

reducing the audio output power of the sound module.

14. A non-transitory readable storage medium, wherein the non-transitory readable storage medium stores a program or instructions, and when the program or instructions are executed by a processor, the steps of the audio processing method according to claim 6 are implemented.

15. The non-transitory readable storage medium according to claim 14, wherein the audio parameter is audio output power, and when adjusting an audio parameter of the sound module, the program or instructions, when executed by the processor, cause the processor to perform:

reducing the audio output power of the sound module.

16. A computer program product, wherein the program product is stored in a non-volatile storage medium, and the program product is executed by at least one processor to implement the steps of the audio processing method according to claim 6.

17. The computer program product according to claim 16, wherein the audio parameter is audio output power, and when adjusting an audio parameter of the sound module, the program or instructions, when executed by the processor, cause the processor to perform:

reducing the audio output power of the sound module.

18. A chip, wherein the chip comprises a processor and a communication interface, the communication interface is coupled to the processor, and the processor is configured to run a program or instructions to implement the steps of the audio processing method according to claim 6.

19. The chip according to claim 18, wherein the audio parameter is audio output power, and when adjusting an audio parameter of the sound module, the program or instructions, when executed by the processor, cause the processor to perform:

reducing the audio output power of the sound module.

* * * * *